July 12, 1960    D. D. ZEBLEY    2,944,658
CONVEYOR CONSTRUCTION
Original Filed April 1, 1957
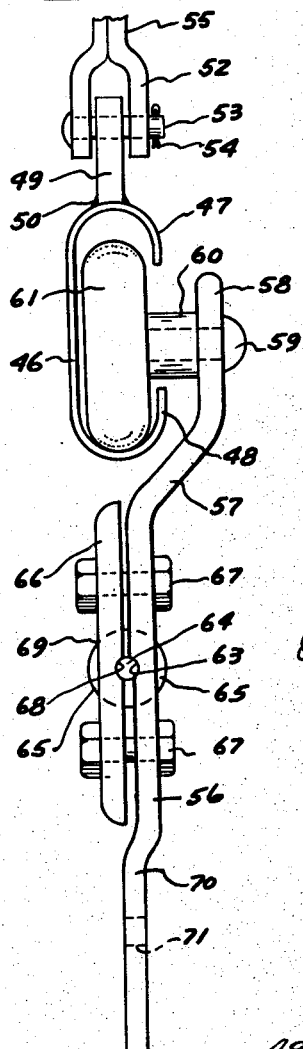
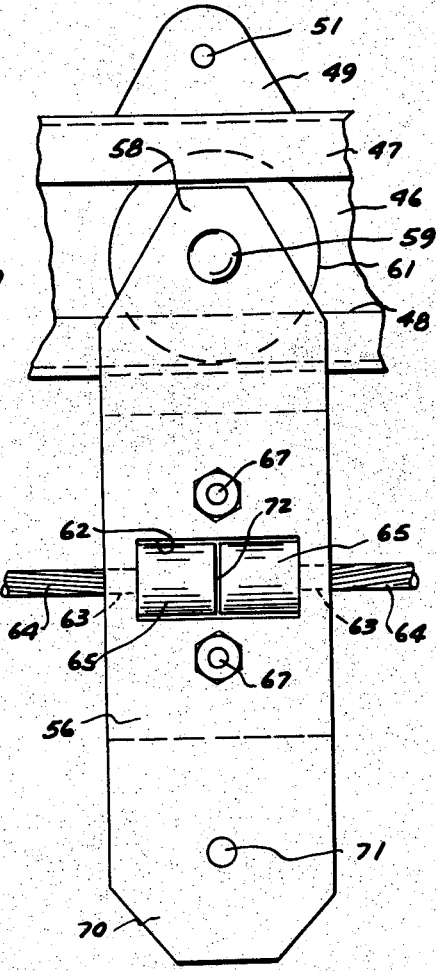
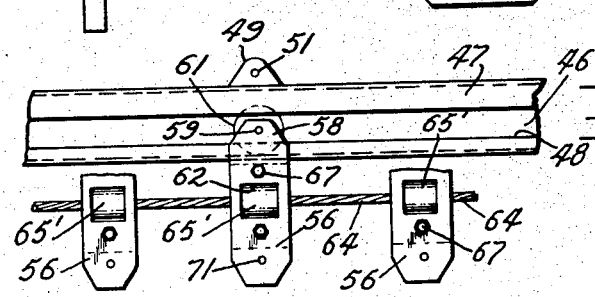
INVENTOR.
DONALD D. ZEBLEY
BY
Robert G. Sloman
ATTORNEY

2,944,658

CONVEYOR CONSTRUCTION

Donald D. Zebley, P.O. Box 7176, Branwood Station, Greenville, S.C.

Original application Apr. 1, 1957, Ser. No. 649,837. Divided and this application Nov. 19, 1958, Ser. No. 774,911

5 Claims. (Cl. 198—177)

This application is a division of my copending patent application, Serial No. 649,837, filed April 1, 1957, relating to a Conveyor Construction, now Patent 2,869,709, dated January 20, 1959.

This invention relates to conveyors and more particularly to a trolley conveyor construction.

It is the further object to provide a conveyor system which consists of a series of relatively short cable sections with cylindrical enlargements secured upon the opposite ends thereof and with trolley brackets constructed for splicing the adjacent ends of a pair of cable elements and in this fashion making up a complete conveyor system.

It is the further object of the present invention to provide a novel form of wheel track for movably mounting and suspending the series of load carrying conveyor brackets, which at the same time serve as a means of splicing the cable elements together.

It is the further object of this invention to provide a very simple light weight trolley conveyor system which consists of a single stamping corresponding to each conveyor bracket together with a cooperative locking plate for immovably securing said brackets in a series to spaced portions of a conveyor cable or to the respective adjacent ends of a series of aligned cable elements for splicing these elements together and at the same time securing the conveyor brackets to the said spliced cable elements and incorporating means for movably mounting the assembly from an overhead track.

These and other objects will be seen from the following specification and claims in conjunction with the appended drawing in which:

Fig. 1 is an end elevational view of a conveyor bracket assembly as suspended from an overhead track.

Fig. 2 is a side elevational view thereof.

Fig. 3 is a fragmentary view similar to Fig. 2 of a slight variation, on a reduced scale.

It will be understood that the above drawing illustrates a preferred embodiment of the invention, and that other embodiments are contemplated within the scope of the claims hereafter set forth.

A conveyor assembly is shown in Figs. 1 and 2 of a light weight construction. A conveyor element is supported by a single roller 61, movably mounted upon a horizontally elongated channel track 46.

Track 46 in Fig. 1 has at its top and bottom the longitudinally extending opposed reverse turned semi-circular shaped track elements 47 and 48, with the roller 61 movably supported loosely upon lower track 48.

As one means of support for track 46 there are provided a series of longitudinally spaced brackets 49 welded to upper portions of the track at 50 and transversely apertured at 51. The track is supported at a series of horizontally spaced points by the mounting brackets 55 whose lower bifurcated ends 52 loosely receive brackets 49 and are secured thereto by the transverse headed pin 53 and the retaining cotter-pin 54.

The conveyor mechanism consists of a series of longitudinally spaced upright cable engaging brackets, one of which is shown. This light weight trolley assembly consists of the formed upright plate 56 which towards its upper end has an outwardly tapered upwardly extending portion 57 terminating in the upright extension 58. Rivet 59 and spacing bushing 60 effectively journal and mount the roller or wheel 61 adapted to move within the open channel track 46.

The central upright flat portion of plate 56 has formed therethrough the horizontally extending rectangular aperture 62. Said plate also has formed upon one side and beyond the ends of aperture 62 the arcuate slots 63 adapted to cooperatively engage portions of the cable elements 64. The slots 63 may be serrated, if desired, to increase frictional contact with the cable elements. Each of the individual cable elements 64 have secured upon their ends cylindrical buttons 65, which as shown in Fig. 2, are in longitudinal registry as at 72 and are nested so as to project laterally through the bracket aperture 62, as shown in Fig. 1.

The assembly is completed by the upright retainer plate 66 which is secured to plate 56 in parallel spaced relation by a pair of bolts and nuts 67 arranged above and below cable buttons 65. Plate 66 also has formed therethrough a rectangular aperture 69 corresponding to aperture 62 and in opposed relation thereto and through which portions of the buttons 65 laterally extend in the same manner. Outer portions of plate 66 upon its interior beyond the aperture 62 are arcuately slotted at 68 opposing the slots 63 adapted to cooperatively receive cable elements 64. Slots 68 may be serrated, if desired.

By this construction there is provided a very simple and effective means of splicing cable elements 64 together by a simple trolley conveyor mechanism which includes plates 56 and 66 bolted together at 67.

The lower portion of plate 56 is laterally offset as at 70 so as to be in vertical registry with the vertical axis of roller 61 and thus defines with the transverse aperture 71 means for supporting a load and for moving the same throughout the length of the conveyor track.

It is contemplated that a single cable may be employed instead of a series of cable elements 64. In that case, a series of spaced elongated cylindrical buttons 65 are secured in spaced relation upon the cable. Apertures 62—69 of plates 56—66 thus receive a single elongated button 65 which will have a length corresponding to the individual lengths of the small buttons 65 in Fig. 2.

The present invention may be adapted for the securing of a series of conveyor assemblies to a unitary cable wherein a plurality of cylindrical buttons 65' are secured to cable 64 in longitudinally spaced relation as shown in Fig. 3.

The construction of the conveyor elements, including the load carrying plates 56 is exactly the same as above described in connection with Fig. 2, except that a single button is received within the elongated aperture 62 of plate 56, and the corresponding aperture of plate 66, Fig. 1.

Having described my invention, reference should now be had to the following claims:

I claim:

1. In a conveyor adapted for movable mounting on and suspended from an overhead track, a pair of aligned cable elements, enlarged cylindrical buttons secured on the ends of said cable elements, an upright load carrying plate depending from said track, there being a horizontally elongated transverse aperture extending through said plate loosely receiving portions of a pair of buttons on adjacent ends of said cable elements, portions of said plate defining the ends of said aperture retainingly engaging the outer ends of said buttons, a retainer plate parallel to said load carrying plate having a similar transverse aperture therethrough loosely receiving portions of said buttons, portions of said retainer plate defining the ends of its aperture retainingly engaging the outer ends of said buttons, and means securing said plates together above and below said buttons.

2. In the conveyor of claim 1, said cable elements extending between and engaging said plates.

3. In the conveyor of claim 1, said buttons extending laterally through said apertures.

4. In the conveyor of claim 1, the inner surfaces of said plates at the ends of said apertures being longitudinally grooved to cooperatively receive adjacent cable elements.

5. In a conveyor adapted for movable mounting on and suspended from an overhead track, an elongated cable, a series of longitudinally spaced cylindrical buttons secured on said cable, a series of longitudinally spaced trolley brackets, each bracket consisting of an upright load carrying plate depending from said track, there being a horizontally elongated transverse aperture extending through said plate loosely receiving a button, portions of said plate defining the ends of said aperture retainingly engaging the ends of said button, a retainer plate parallel to said load carrying plate having a similar transverse aperture therethrough receiving a portion of said button, portions of said retainer plate defining the ends of its aperture retainingly engaging the inner ends of said button, and means securing said plates together above and below said button.

References Cited in the file of this patent

UNITED STATES PATENTS

| | | |
|---|---|---|
| 865,263 | Moe | Sept. 3, 1907 |
| 1,294,813 | Lammert et al. | Feb. 18, 1919 |
| 2,702,114 | Jensen | Feb. 15, 1955 |